Patented May 27, 1930

1,760,713

UNITED STATES PATENT OFFICE

GEORGE F. A. OCHS, OF NEWARK, NEW JERSEY

COMPOSITION BLOCK

No Drawing.   Application filed July 25, 1927. Serial No. 208,411.

The object of the invention is to provide a composition in the form of an artificial or manufactured wood which may be light in weight, cheap to manufacture, and possess high electrical insulating properties adapting it for use in electrical installations; and to provide a composition particularly adapted as a filler for artificial ties such as that illustrated in Patent No. 1,600,129.

The composition consists of gypsum, Portland cement or its equivalent, loose powdered asbestos, asphalt, and a vegetable fiber, such as wheat, rye or oat straw, or corn-stalks.

In the preparation of the composition, the vegetable fiber, whether it be corn-stalks or straw, is cut into short lengths of one and one-half, two or three inches, being shredded and ground into a fine fiber. The asphalt is heated, preferably in steam-heated kettles, to the point where it flows readily and this fiber is added to it together with the gypsum, cement and asbestos, the whole being stirred until the mixture is complete, when it is run to hydraulic presses and pressed into slabs or blocks of the desired form.

The proportions of the constituent elements are by the weight substantially as follows:

Gypsum, 30 pounds.
Cement, 20 pounds.
Asbestos, 15 pounds.
Asphalt, 5 pounds.
Vegetable fiber, 30 pounds.

The invention having been described, what is claimed as new and useful is:

A composition of the kind indicated consisting substantially of thirty pounds of gypsum, twenty pounds of cement, fifteen pounds of asbestos, five pounds of asphalt and thirty pounds of vegetable fiber.

In testimony whereof he affixes his signature.

GEORGE F. A. OCHS.